Figure 1:
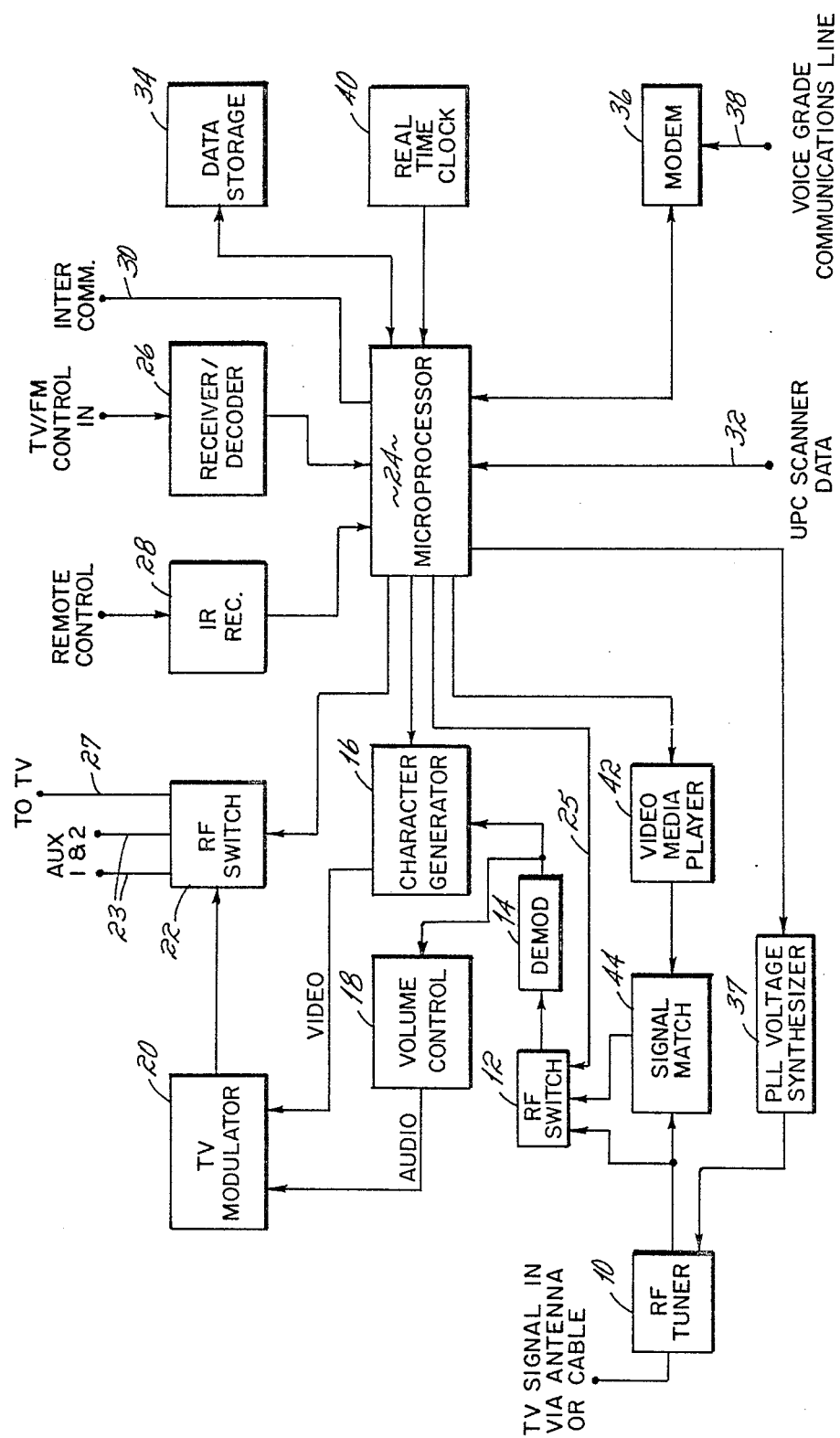

United States Patent [19]

Campbell et al.

[11] Patent Number: 4,974,085
[45] Date of Patent: Nov. 27, 1990

[54] TELEVISION SIGNAL SUBSTITUTION

[75] Inventors: Harry D. Campbell, Villa Hills, Ky.; Kenneth W. Silvers, Chicago, Ill.; Chang J. Kim, Cincinnati, Ohio

[73] Assignee: Bases Burke Institute, Inc., Cincinnati, Ohio

[21] Appl. No.: 346,442

[22] Filed: May 2, 1989

[51] Int. Cl.⁵ .............................................. H04N 5/268
[52] U.S. Cl. .................................... 358/181; 358/189; 358/85
[58] Field of Search ............... 358/171, 181, 189, 85, 358/86, 183, 22, 84

[56] References Cited

U.S. PATENT DOCUMENTS

| | | |
|---|---|---|
| 3,454,881 | 7/1969 | Fletcher . |
| 3,796,829 | 5/1974 | Gray . |
| 4,074,310 | 2/1978 | Hurney et al. . |
| 4,311,971 | 1/1982 | LaRosa . |
| 4,329,675 | 5/1982 | Van Hulle ........................ 358/181 |
| 4,331,973 | 5/1982 | Eskin et al. . |
| 4,347,604 | 8/1982 | Saito et al. . |
| 4,388,644 | 6/1983 | Ishman et al. . |
| 4,404,589 | 9/1983 | Wright, Jr. . |
| 4,506,387 | 3/1985 | Walter .............................. 358/86 |
| 4,546,382 | 10/1985 | McKenna et al. . |
| 4,616,261 | 10/1986 | Crawford et al. ................ 358/183 |
| 4,621,242 | 11/1986 | Theall, Jr. et al. . |
| 4,630,108 | 12/1986 | Gomersall . |
| 4,647,964 | 3/1987 | Weinblatt . |
| 4,658,290 | 4/1987 | McKenna et al. . |
| 4,717,970 | 1/1988 | Long . |
| 4,724,491 | 2/1988 | Lambert . |
| 4,733,301 | 3/1988 | Wright, Jr. . |
| 4,734,764 | 3/1988 | Pocock et al. . |
| 4,766,497 | 8/1988 | Banach et al. . |
| 4,814,883 | 3/1989 | Perine et al. .................... 358/181 |
| 4,888,638 | 12/1989 | Bohn ................................ 358/85 |

Primary Examiner—James J. Groody
Assistant Examiner—Kim Yen Vu
Attorney, Agent, or Firm—Wood, Herron & Evans

[57] ABSTRACT

A received television signal (such as a television commercial) is substituted out in favor of a local recorded signal on a record containing the substitute signal. A detector detects a command signal indicative of a broadcast program signal to be substituted out. An RF switch is operable to selectively supply the broadcast program signal or the substitute signal to the television receiver. A signal matching circuit is responsive to the broadcast program signal and the substitute signal to match the levels of both the audio and video portions of the substitute signal to the program signal.

9 Claims, 2 Drawing Sheets

TELEVISION SIGNAL SUBSTITUTION

This invention relates to television signal substitution, and particularly to apparatus for substituting test commercial signals for signals broadcasted by a broadcast station.

It is common in the market research industry to test prospective television commercials before they are actually broadcast publicly. One common technique has been to display a test commercial to a test panel in the environment of a theater, or the like. However, research indicates that when persons known they are being shown test commercials, they alter behavior patterns to react in a manner that they believe the researcher wishes them to act, rather than in their own natural reaction. Consequently, market research organizations have employed commercial signal substitution for television receivers of volunteers, whereby the volunteers permit the market research organization to substitute test commercials for commercials transmitted by the broadcast station. The concept of such substitution is that test commercials are substituted for broadcast commercials without the specific knowledge of the test audience. Consequently, more accurate information may be obtained from the reactions of the test audience.

One problem with prior television signal substitution techniques has been that the technique was feasible only with cable systems so that test commercials are substituted for commercials broadcast only over the cable system. Substitution techniques have been proposed whereby commercials are broadcast through a full broadcast facility on a separate channel, and apparatus at the receiver would automatically change the channel of the receiver. The cable system, of necessity, excluded potential market research participants, namely those persons without cable connection. The broadcast system, while effective, was also quite expensive as it required duplicate television broadcast facilities to operate in coordination with the commercial being substituted. Examples of these two systems can be found in U.S. Pat. No. 3,366,731 issued to Wallerstein (cable system), 3,639,686 issued to Walker et al (broadcast), and 4,733,301 issued to Wright, Jr. (broadcast).

The present invention contemplates signal substitution techniques employing a video disk player, video cassette player, or the like, containing prerecorded test commercials. The player is located locally at the television receiver. On command from a command center, a command signal is broadcast to the receivers via a sub-carrier to operate the video media player to substitute a prerecorded television commercial for a commercial being broadcast by the television station operating on the carrier. The command center may be part of the television broadcasting station, or separate therefrom. In either case, the sub-carrier command signal is transmitted to substitute out a selected television commercial. Alternatively, the television commercial being broadcast might contain an identifying signature or data which is detected by signal detectors at the local television receiver to activate the video media player to substitute a test commercial for the broadcast commercial.

One feature of the present invention resides in the provision of a voltage controlled attenuator to match the signal level from the video media player to the signal level of the broadcast station.

Another feature of the present invention resides in the fact that the circuit used to perform signal substitution is symmetrical with respect to the local and remote RF signals. Consequently, no information will be added to or lost from one signal without similarly affecting the other, thereby assuring the local signal level will properly match the remote broadcast signal level.

Figure 2:
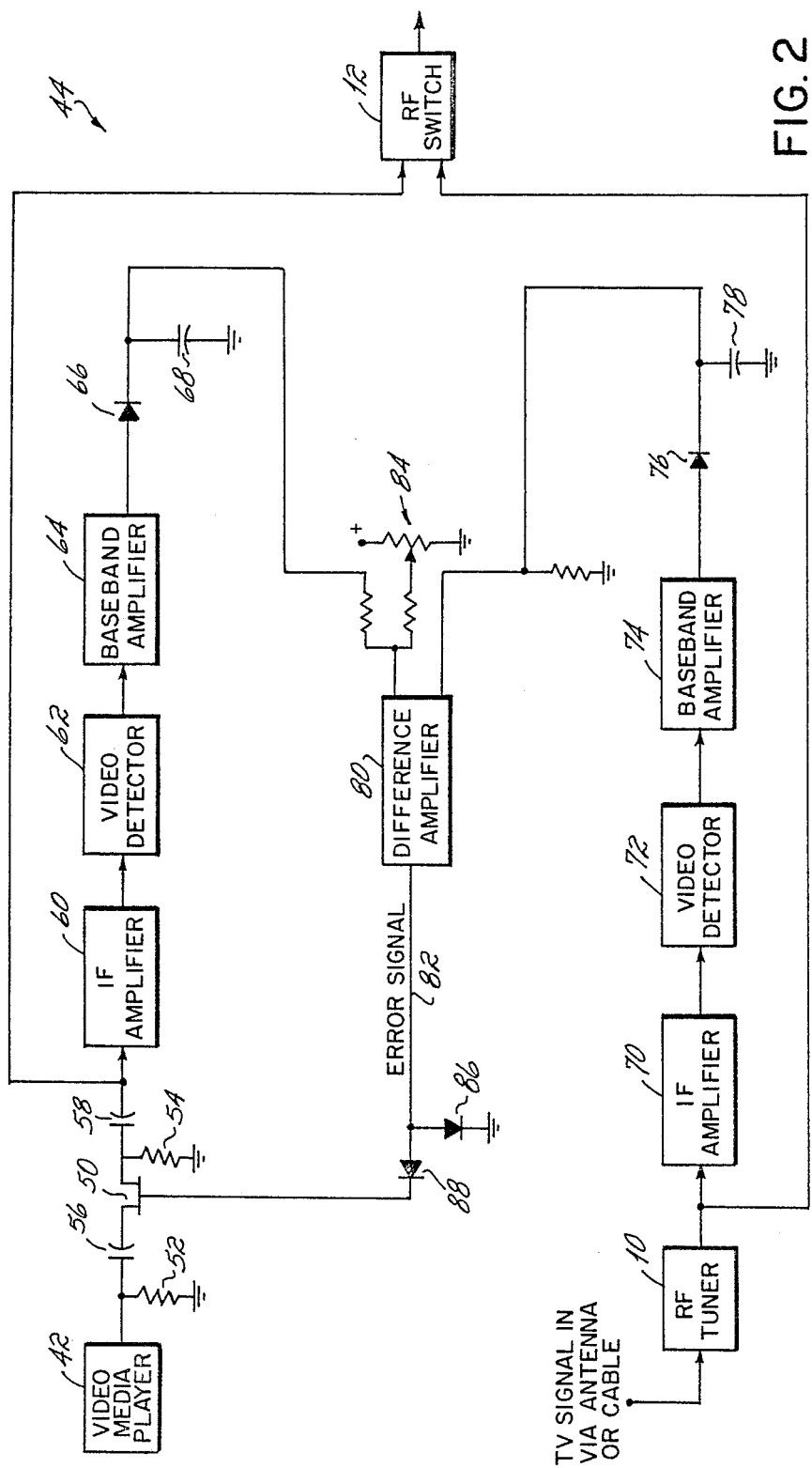

The above and other features of this invention will be more fully understood from the following detailed description, and the accompanying drawings, in which:

FIG. 1 is a block circuit diagram of a signal substitution system in accordance with the presently preferred embodiment of the present invention; and FIG. 2 is a block circuit diagram of the signal matching circuit employed in the present invention.

Referring to the drawings, and particularly in FIG. 1, there is illustrated a block circuit diagram of a signal substitution system for substituting television commercials recorded on a local video media for broadcast commercials, and for recording information concerning the viewing and purchasing habits of the viewer. The apparatus includes an RF tuner 10 for receiving the television signal from an antenna or cable system, in a manner well-known in the art. The received television signal operates through RF tuner 10 and RF switch 12 to demodulator 14, volume control 18 and character generator 16. Character generator 16 provides a video input to TV modulator 20, and volume control 18 provides an audio input to modulator 20. Modulator 20 provides an input to RF switch 22. Auxiliary units (not shown) such as VCRs (video cassette recorders) and the like are connected at inputs 23 to RF switch 22. A television receiver (not shown) is connected to output 27 of the RF switch 22 which in turn is connected to microprocessor 24.

Microprocessor 24 is connected to character generator 16 to provide data to character generator 16 to generate messages for display on the television receiver connected to output 22. Replies to the displayed messages are provided through a remote control (not shown) operating through IR (infra red) receiver 28 to microprocessor 24. The remote control operating through receiver 28 also controls microprocessor 24 to operate auxiliary units connected to input 23 of switch 22. Receiver/decoder 26 is connected to microprocessor 24 to receive control and command signals from a command center (not shown). A data storage unit, such as a memory 34, is connected to microprocessor 24, as is real time clock 40. A central station (as distinct from the command center) is connected via telephone line 38 through modem 36 to microprocessor 24, and a unit price code (UPC) scanner (not shown) is connected via lead 32 to microprocessor 24. Additionally, microprocessor 24 provides outputs to phase lock loop (PLL) tuning synthesizer 37 to control the tuning voltage for RF tuner 10, and microprocessor 24 provides control signals to video media player 42 and RF switch 12.

In the event the household being monitored contains a plurality of television receivers, it is desirable to operate all household television receivers through individual secondary household collectors. The secondary collector circuits are similar to that shown in FIG. 1, except the secondary collector circuits do not employ telephone modems 36. The secondary collector circuits are connected to the primary collector circuit (FIG. 1) through communication lead 30. Lead 30 is employed to receive channel identification and other data for storage in data storage unit 34 for eventual transmission to the central station via modem 36 and lead 38 of the primary collector circuit.

In operation of the apparatus thus far described, information concerning television channels viewed, time-of-day, and/or auxiliary units (such as VCRs) in operation is stored in data storage unit 34. Thus, the viewing and purchasing habits of the viewer may be recorded through microprocessor 24 in conjunction with data storage unit 34. When it is desired to substitute commercials, the command center provides a command signal through receiver/decoder 26 to microprocessor 24 to operate video media player 42 and switch 12, causing the video media player to provide prerecorded commercial messages through switch 12 at switch 22 to the television set connected to the output 27. Also, command signals from the command center may be used to operate character generator 16 to generate preselected messages from data storage 34 to the television receiver. For example, the microprocessor 24 may cause the display of survey questions concerning the commercial messages. The remote control, which may include a keyboard (not shown) connected to IR receiver 28 may be used to generate information as responses to the survey questions and/or provide other data for storage in data storage 34 through microprocessor 24. For example, specific information as to the identity of members of the viewing audience may be inputted to microprocessor 24 from the keyboard.

In some market research areas it may also be desirable to learn the buying habits of the viewer. In this regard, the UPC scanner connected to lead 32 may be used by the participant to scan the UPC codes on purchased articles for purposes of identification of the actual products purchased by that person. This information may also be inputted to data storage unit 34 by microprocessor 24.

Periodically, such as once each day, a central station connected to lead 38 may operate through modem 36 to connect to the microprocessor to transfer data in data storage unit 34 to a central computer for correlation with other data for market research purposes. For example, lead 38 may be an ordinary telephone line and the modem may include dial in/out apparatus whereby the central computer may connect to the microprocessor 24 via an ordinary telephone system.

In the use of the apparatus, the command center sends command signals to the participating users which are received through receiver/decoder 26 for operation as heretofore described. The command center may, for example, be part of the broadcast station carrier. Alternatively, the command center may be a separate broadcast facility generating sub-carriers for that specific purpose. Yet another alternative is that the command center may be connected via telephone lines, as in the case of the central station, for downloading command signals directly to the participating receivers. In any case, the command center will ordinarily be a local command center serving a geographic area also served by local television broadcast stations, or cable systems. The central station, on the other hand, may be one station operating nationally capable of connecting via telephone lines to household participants in all geographic regions being surveyed.

The present invention concerns signal substitution of television commercials for commercials actually broadcast by the broadcast station. The purpose of this signal substitution is to test the effectiveness of new commercials prior to their introduction to the general public. The effectiveness of these test commercials may be measured by the actual purchasing habits of the viewer. Hence, valuable market research information can be gained from knowing the viewing habits of test audiences, their purchasing habits, and their reaction to test commercials.

Signal substitution occurs through the apparatus shown in the left portion of FIG. 1. When a television commercial to be substituted out is received through RF tuner 10 and RF switch 12. A command signal received on a sub-carrier via receiver/decoder 26 provides data to microprocessor 24, which in turn sends a command signal to RF switch 12 and operates video media player 42 to immediately substitute the desired test commercial for the broadcast commercial. The desired test commercial signal is forwarded through signal matching circuit 44 to RF switch 12. Switch 12 switches off the television broadcast signal from RF tuner 10 and switches in the signal from signal matching circuit 44. FIG. 1 shows that demodulator 14 separates the video and audio portions of the signal, and that this separation occurs downstream of signal matching circuit 44. Thus, both the video and the audio portions of the test commercial signal are matched to the levels of the broadcast commercial. The test commercial signal is forwarded to the TV set in the same manner as the broadcast commercial would have been had it not bee substituted out. The video media player may, for example, be a video disk player containing a plurality of test commercials which are addressed and substituted in for selected broadcast commercials on command from the command center. A video cassette player may also be employed. Upon conclusion of the test commercial, microprocessor 24 operates RF switch 12 to return to the signal broadcast by the broadcaster.

Signal matching circuit 44 is shown in greater detail in FIG. 2 and employs, as an output from the video media player 42 a voltage controlled attenuator comprising an N channel JFET 50 as a variable resistor to control the attenuation level. Resistors 52 and 54 and capacitors 56 and 58 operate in conjunction with JFET 50 to provide accurate attenuation. The output of the voltage controlled attenuator is provided to IF amplifier 60 and as one input to RF switch 12. IF amplifier 60 provides signal amplification of the 61.25MHz intermediate frequency (IF) for the video detector 62. The IF frequency of 61.25MHz matches the RF output of typical video cassette recorders and video disk players, thereby eliminating the need for mixers and filters to shift incoming signals to the IF signal frequency. The IF amplifier may be a LM1823 integrated circuit comprising a five-stage gain controlled amplifier with a typical gain of 35dB and an automatic gain control range of 55dB.

Video detector 62 is a synchronous detector employing a limiter amplifier to remove amplitude information from the incoming signal and provide a signal to a phase locked loop (not shown). Adjustment of the detector for maximum detector performance is obtained through the phase locked loop of the video detector 62. The output of video detector 62 is buffered to provide an isolation of the detector from the load. Baseband amplifier 64 receives the output from video detector 62 and serves to increase the video signal to a level suitable for peak detection by the peak detector comprising diode 66 and capacitor 68. The peak detector is designed to provide a DC voltage corresponding to the amplitude of the video signal vertical sync/blanking pulse. During the sync/blanking pulse, diode 66 conducts charging capacitor 68 to the voltage level of the sync/blanking pulse. When the video signal drops below the level of the sync/blanking pulse, diode 66 ceases conducting, thereby isolating the charge on capacitor 68 from the input signal, thereby causing it to hold the voltage of the sync/blanking pulse. The RC time constant of the peak detector is chosen so that no significant decay of the voltage of the capacitor will occur, yet the capacitor voltage is allowed to follow changes in the sync/blanking pulse level.

The output of RF tuner 10 is provided to RF switch 12, and through IF amplifier 70, video detector 72, baseband amplifier 74 and a peak detector comprising diode 76 and capacitor 78. In essence, the operation of RF amplifier 70, video detector 72, base band amplifier 74, and the peak detector comprising diode 76 and capacitor 78 is identical to the IF amplifier 60, video detector 62, baseband amplifier 64 and the peak detector comprising diode 66 and capacitor 68 described in connection with the channel connected to the video media player. The outputs of the two peak detectors are provided as an input to difference amplifier 80 to provide an error signal on lead 82 to the gate of JFET 50. The signal on capacitor 78 is provided to the non-inverting input of difference amplifier 80, while the signal on capacitor 68 is provided to the inverting input of difference amplifier 80. Also, the inverting input employs a DC bias voltage input 84 to bias the JFET 50. Preferably, both the inverting and non-inverting inputs of difference amplifier 80 have voltage gain factors of about 10 to ensure that the JFET 50 will quickly lock and track the signal level on the capacitor 78. The N channel JFET 50 requires a negative bias voltage to operate. A positive voltage might severely damage the transistor. Consequently, it may be convenient to clamp the error signal channel 82 to ground through a suitable diode 86 to prevent the error signal from rising more than the junction voltage of the JFET. A diode 88 may also be employed in channel 82 to prevent unwanted feedback from the JFET into the difference amplifier 80.

The present invention thus provides apparatus for substituting prerecorded television commercials for commercials being broadcast by a television station. The apparatus employs prerecorded test commercials which are selectively played by a video media player at the location of the television receiver. The apparatus is effective in operation and provides good signal substitution without perceivable changes in signal levels.

This invention is not to be limited by the embodiment shown in the drawings and described in the description, which is given by way of example and not of limitation, but only in accordance with the scope of the appended claims.

What is claimed is:

1. Apparatus for use in combination with a television receiving means for substituting a selected local signal for a received program signal from a remote source, the apparatus comprising: record means containing a record of substitute signals to be substituted for program signals; receiver means for receiving a program signal from a remote source; detector means for detecting a program signal to be substituted out, said record means being responsive to said detector means for selecting a record of a substitute signal to be substituted for a program signal; switch means connected to said record means and said receiver means for supplying a program signal to said television receiving means and operable to supply said substitute signal to said television receiving means when said record means supplies said substitute signal; and signal matching means connected to said receiver means and said record means for matching the levels of the audio portion and the visual portion of said substitute signal to the audio portion and the visual portion of said program signal.

2. Apparatus according to claim 1 wherein said switch means is responsive to said record means for supplying said substitute signal to said television receiving means.

3. Apparatus according to claim 1 wherein said switch means is responsive to said detector means to selectively connect said television receiving means to said receiver means or said record means.

4. Apparatus for use in combination with a television receiving means for substituting a selected local signal for a received program signal from a remote source, the apparatus comprising: record means containing a record of substitute signals to be substituted for program signals; receiver means for receiving a program signal from a remote source; detector means for detecting a program signal to be substituted out, said record means being responsive to said detector means for selecting a record of a substitute signal to be substituted for a program signal; switch means connected to said record means and said receiver means for supplying a program signal to said television receiving means and operable to supply said substitute signal to said television receiving means when said record means supplies said substitute signal; and signal matching means connected to said receiver means and said record means for matching the level of said substitute signal to said program signal wherein said signal matching means comprises a voltage-controlled attenuator means connected to said record means, first peak detector means connected to said attenuator means for determining the peak voltage from said attenuator means, second peak detector means connected to said receiver means for determining the peak voltage from said receiver means, and difference means connected to said first and second peak detector means for determining the difference voltage between the peak voltages from said attenuator means and said receiver means, said attenuator means being responsive to said difference voltage for adjusting the attenuation of said attenuator means to adjust the peak voltage from said attenuator means to match the peak voltage from said receiver means.

5. Apparatus according to claim 4 wherein said switch means is connected to said attenuator means and said receiver means.

6. Apparatus according to claim 4 wherein said attenuator means is a JFET.

7. Apparatus according to claim 6 wherein said switch means is connected to said attenuator means and said receiver means.

8. Apparatus according to claim 4 wherein said switch means is responsive to said record means for supplying said substitute signal to said television receiving means.

9. Apparatus according to claim 4 wherein said switch means is responsive to said detector means to selectively connect said television receiving means to said receiver means or said record means.

* * * * *